United States Patent [19]

Maher

[11] 4,135,224

[45] * Jan. 16, 1979

[54] CERAMIC CAPACITOR HAVING A BISMUTH-CONTAINING SILVER-DOPED DIELECTRIC OF (Pb,La) (Zr,Ti)O$_3$

[75] Inventor: Galeb H. Maher, North Adams, Mass.

[73] Assignee: Sprague Electric Company, North Adams, Mass.

[*] Notice: The portion of the term of this patent subsequent to May 31, 1994, has been disclaimed.

[21] Appl. No.: 802,160

[22] Filed: May 31, 1977

Related U.S. Application Data

[63] Continuation-in-part of Ser. No. 619,089, Oct. 2, 1975, Pat. No. 4,027,209.

[51] Int. Cl.$^2$ ............................................. H01G 4/12
[52] U.S. Cl. ................... 361/321; 29/25.42; 252/63.2; 252/63.5; 264/61; 361/322
[58] Field of Search ............... 361/321, 322; 252/63.2, 252/63.5; 29/25.42; 264/61

[56] References Cited

U.S. PATENT DOCUMENTS

| | | | |
|---|---|---|---|
| 3,499,704 | 3/1970 | Land | 264/61 X |
| 3,518,198 | 6/1970 | Tsubouchi | 252/62.9 |
| 3,591,504 | 7/1971 | Jaffe | 361/321 X |
| 3,638,084 | 1/1972 | Burn | 317/258 |
| 3,732,117 | 5/1973 | Nitta | 252/63.5 X |
| 4,027,209 | 5/1977 | Maher | 361/321 |

OTHER PUBLICATIONS

Rusinko, "Dielectric Mixing in the PLZT-Pb$_5$Ge$_3$O$_{11}$ System," Thesis Penn State College of Earth & Mineral Sciences, 5/75.
Vardhan et al., A low-loss Thin Film Capacitor, Thin Solid Films, 8 (1971) pp. 55-60 relied on #1.

*Primary Examiner*—Richard R. Kucia
*Attorney, Agent, or Firm*—Connolly and Hutz

[57] ABSTRACT

The dielectric material of a ceramic capacitor contains a high temperature silver doped ceramic with either no glass or with a small proportion of a low temperature glass. The ceramic component consists essentially of a lead zirconate in which from 0.07 to 0.16 molar parts of the lead are replaced by lanthanum and in which from 0.10 to 0.40 molar parts of the zirconate are replaced by titanate. The capacitors are preferably fired in a closed atmosphere at temperatures from above 2000° F to 2200° F. Silver containing electrodes may be employed in a monolithic capacitor of this invention, the co-fired electrode advantageously causing a silver doping of the ceramic that in turn improves the stability of capacitance with temperature and applied voltage. Bismuth trioxide is added to the green ceramic body that permits a lower firing temperature or is included in the glass formulation, in both cases the bismuth serving to accelerate a silver reaction with the ceramic at firing.

17 Claims, 3 Drawing Figures

CERAMIC CAPACITOR HAVING A BISMUTH-CONTAINING SILVER-DOPED DIELECTRIC OF (Pb,La) (Zr,Ti)O$_3$

CROSS REFERENCES

This application is a continuation-in-part of U.S. patent application Ser. No. 619,089 filed Oct. 2, 1975 now U.S. Pat. No. 4,027,209 to be issued May 31, 1977.

BACKGROUND OF THE INVENTION

This invention relates to ceramic capacitors having a medium temperature firing dielectric of lead-lanthanum zirconate-titanate and glass, and more particularly to such capacitors wherein the dielectric contains bismuth and the ceramic is doped and reacted with silver. The term doped as used herein is intended to mean reacted and not simply mixed with.

Glass containing ceramic dielectric materials are known as being capable of densification at medium firing temperatures below 2200° F., whereas ceramics without glass generally require a firing temperature of greater than 2200° F. and often at least 2450° F.

Lead-zirconate-titanate ceramics have been employed for many years as electromechanical transducers and more recently lead-lanthanum zirconate-titanates have found use in electro-optic transducers. For these purposes, the ceramic is formulated so as to form a ferroelectric body, which formulations are unsuitable for making electrical capacitors that must exhibit a relatively stable dielectric constant as a function of the applied electric field. It is common practice to fire these lead-containing ceramics in a closed crucible that has a quantity of a lead compound contained therein for providing a rich lead atmosphere and preventing escape of the volatile lead from the ceramic formulation.

It is often desirable to have a capacitor that exhibits a low temperature coefficient of capacitance (TCC) and a low voltage coefficient of capacitance (VCC). It is further desirable that the dielectric material have a high dielectric constant to minimize the required size of a capacitor having a given capacity value. It is well known that the addition of glass to a ceramic body will smooth the TCC at the expense of reducing the dielectric constant.

It is an object of this invention to provide an improved ceramic capacitor that exhibits a low TCC and a high volt-microfarad product for any given capacitor size.

It is a further object of this invention to provide a low cost monolithic capacitor suitable for use at high a.c. and d.c. voltages.

It is another object of this invention to provide an anti-ferroelectric lead-lanthanum zirconate-titanate dielectric body having a low TCC and a high dielectric constant.

SUMMARY OF THE INVENTION

A ceramic capacitor is comprised of at least two spaced electrodes in contact with and separated by a dielectric material containing at least 0.4 weight percent Bi$_2$O$_3$. The dielectric material consists of a major proportion of a dense high firing temperature ceramic and from 0 to 8 weight percent of a low melting temperature glass. The high temperature ceramic consists essentially of a lead zirconate in which from 0.07 to 0.16 molar parts of the lead are replaced by lanthanum and in which from 0.10 to 0.40 molar parts of the zirconate are replaced by titanate. The lead-lanthanum zirconate-titanate is doped with from 0.1 to 1.0 weight percent silver.

The dielectric materials of this invention will densify at firing temperatures of greater than 2000° F. to 2200° F. in a closed crucible and monolithic capacitors made therefrom may advantageously include buried silver-containing electrodes. The dielectric materials of this invention have no glass may be fully densified at temperatures near the top end of the above range. The low temperature glass of the glass-containing dielectric materials of this invention should have a melting temperature of less than 1600° F. and preferably less than 1400° F., and less than 4.5 weight percent of such glass is preferred in the dielectric material to provide a high dielectric constant. A wide variety of low temperature glasses are suitable such as borate, lead borosilicate, bismuth borosilicate, bismuth alumina silicate, lead alumina borate, and lead bismuth boroalumina silicate. Small additions of alkali-earth or -metal oxides may also be included. More specifically, a range of suitable glass compositions is defined by the following components given in weight percent: from 8 to 50% of the glass formers selected from B$_2$O$_3$, SiO$_2$ and GeO$_2$; from 0 to 3% Al$_2$O$_3$; from 0 to 11% ZnO; from 0 to 50% CdO; from 0 to 90% Bi$_2$O$_3$; and, from 0 to 85% PbO.

In a monolithic ceramic type capacitor of this invention the anti-ferroelectric PLZT ceramic inherently provides a stable capacity with voltage. The use of at least one buried silver-containing electrode results in a reaction between the electrode and the dielectric at firing wherein silver diffuses into and reacts with the lead titanate zirconate lattice, providing a further improvement, namely providing a smoother TCC curve and a low dissipation factor (DF).

This invention recognizes the principle that the addition of bismuth trioxide (Bi$_2$O$_3$) to the lead-lanthanum zirconate-titanate in the absence of any glass, reduces the minimum temperature of firing at which full densification of the ceramic can be achieved. It has further been discovered that in such a glass-free system that includes silver, either in buried electrodes or as an additive to the unfired ceramic, the bismuth promotes a fuller reaction of the silver with the ceramic at firing to provide a smoother TCC characteristic of the fired capacitor. This enhanced silver reaction in the presence of bismuth is not fully understood but it is believed that some of the bismuth also reacts with the ceramic along with the silver, perhaps in the form of AgBiO$_2$.

It has further been found that when small amounts of glass are included with the PLZT ceramic, the inclusion of bismuth in the glass also reduces the densification temperature of the glass-ceramic dielectric and will also cause a more complete reaction between the ceramic and the silver, which silver is either mixed with the ceramic or is in the buried electrodes. Thus the addition of bismuth advantageously permits the densification of PLZT ceramic materials especially with from 0 to 4.5% glass at temperatures between 2000° F. and 2200° F., at which temperatures it is generally required to fire the ceramic mixture in a closed container, but at which temperatures it is yet possible to include some silver in the co-fired buried electrodes. These low quantities of glass lead to high dielectric constant bodies and the accelerated silver reaction simultaneously provides a smoother TCC curve. The closed firing prevents escape of substantial quantities of lead as well as other volatile components that may be in the glass such as cadmium and bismuth.

The bismuth may be added to the unfired ceramic powder as $Bi_2O_3$, or as a component oxide in the glass powder prior to firing when a glass-ceramic dielectric body is to be made, to provide the desired enhancement of the silver-PLZT reaction. The addition as a $Bi_2O_3$ powder in the ceramic mixture has the additional advantage of reducing the temperature required to densify the body as has been noted. The use of other additive bismuth compounds may accelerate the silver-PLZT reaction but $Bi_2O_3$ is preferred since as a powder additive it also reduces the sintering temperature.

Capacitors that have been produced according to this invention exhibit a heretofore unrealized combination of properties, namely, low stable VCC and TCC characteristics and a high dielectric constant (K) of the dielectric material.

DESCRIPTION OF THE PREFERRED EMBODIMENTS

Figure 1:
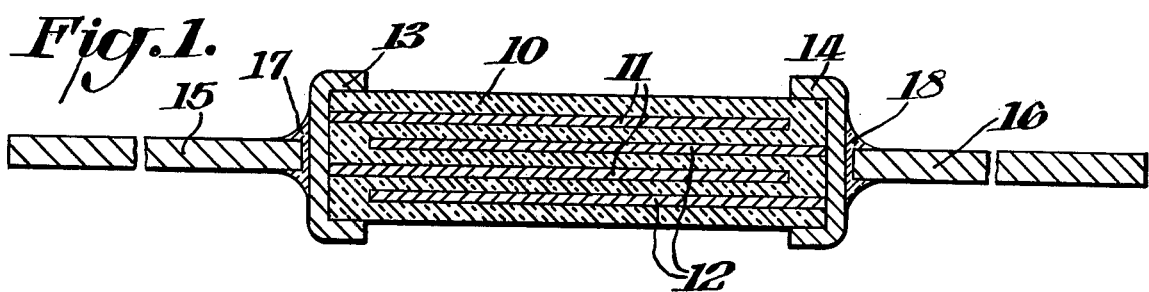
FIG. 1 shows in cross-section a monolithic ceramic capacitor of this invention.

Monolithic capacitors being designated here as hand screened (HM) were made in the laboratory and each comprises a single pair of electrodes buried in the dielectric material. Other monolithic capacitors were produced on standard manufacturing equipment by well known methods of producing such monolithic capacitor products, being identified here by the letter M. A brief description of the methods and steps that were employed for the examples is as follows.

For making the glass, approximately 600 grams of the constituent oxides, for each of three glass compositions, as shown in Table I below, were melted in a platinum crucible between 1200° F. and 1600° F. for 1 hour and then water quenched. The resulting material was then jet pulverized to about 1 to 3 microns average particle diameter.

Table I

| | Glass Compositions (in weight percent) | | |
|---|---|---|---|
| | B1 | B2 | B3 |
| $B_2O_3$ | 13.1 | 5.0 | 5.3 |
| $SiO_2$ | 12.3 | 5.0 | 4.4 |
| $Al_2O_3$ | 2.5 | 1.0 | 1.0 |
| ZnO | 10.0 | 5.0 | 2.3 |
| CdO | 0 | 36.0 | 0 |
| $Bi_2O_3$ | 0 | 23.0 | 87.0 |
| PbO | 62.1 | 25.0 | 0 |

For making the (Pb,La) (Zr,Ti)$O_3$ ceramic, the oxides of Pb, Zr and Ti and lanthanum carbonate were weighed out in the desired molar proportions according to the formula below and the composition ratios of Table II to yield about a 30 pounds mixture.

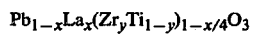

$$Pb_{1-x}La_x(Zr_yTi_{1-y})_{1-x/4}O_3$$

The mixture was ball milled in deionized water, oven dried at 250° C., granulated and then calcined at 1650° F. in an alumina sagger soaking for 1 hour at this temperature. This material was then recalcined for 1½ hours at 2100–2250° F. in a closed crucible. This blend was then crushed and jet pulverized to an average particle size of about 1.2 microns, as determined by a standard Fisher Sub-sieve analyzer. The above formula is more accurately a recipe having been taught to be lead rich and having been preferred for preparing the starting materials by those who have employed such ceramics in electro-optical transducer devices.

The formulations of three experimental anti-ferroelectric ceramic compositions of this invention are shown in Table II.

Table II

| | Ceramic Compositions (in mole percent) | | |
|---|---|---|---|
| | A1 | A2 | A6 |
| Pb/La | 86/14 | 88.8/11.2 | 88/12 |
| Zr/Ti | 75/25 | 75/25 | 70/30 |

A mixture of the glass and the ceramic powders in the specific weight ratios indicated in Table III was stirred with an organic binder medium of essentially turpentine, 6% pine oil and 5% lecithin. This dispersion of slurry contained about 70% by weight of the solids, namely the ceramic and glass. The blend was milled for about 6 hours.

A number of experimental hand screened monolithic capacitors (HM) were made by repeatedly hand screening a layer of the dielectric slurry on a glass substrate and drying. Two film electrodes of a conducting paste were successively interleaved and buried within the layers of dielectric materials so as to be spaced by about 0.0015 inch of a dielectric layer.

Those capacitors that were fired on an open slab in air, as indicated (open) in Table III were fired for 1 hour at the indicated peak firing temperature.

For those capacitors that were fired in a closed crucible, as indicated (closed) in Table III, the procedure for bringing the green body to maturity was as follows: The green bodies were first prefired at 1300° F. in air for one hour in order to remove the organic binder. The bodies were then stacked and placed in a fused alumina crucible (50 c.c. capacity) along with a quantity (2 grams) of lead titanate. The crucible was then covered and contained about the same amount of air by volume as was also represented by the stacked bodies and powder. The closed crucible was then heated to the firing temperature, indicated for the various examples in Table III, and soaked for about 2 hours at the stated temperature.

Table III

| Example | Dielectric (% by weight) Glass | Dielectric (% by weight) Ceramic | $Bi_2O_3$ (% by wt.) | Firing Temp. (° F) | Firing Atm. | Type Capacitor | Type Electrode |
|---|---|---|---|---|---|---|---|
| X1 | 6.4 B1 | 93.6 A1 | (0) | 1950 | Open | HM | Ag/Pd |
| X2 | 7 B2 | 93 A2 | (1.6) | 1950 | Open | HM | Ag/Pd |
| X3 | 7.8 B3 | 92.2 A2 | (6.8) | 1950 | Open | HM | Ag/Pd |
| X8 | — | 100 A2 | (0) | 2200 | | HM | Au/Pt |
| X13 | 2 B2 | 98 A2 | (.46) | 2050 | Open | HM | Ag/Pd |
| X13a | 2 B2 | 98 A6 | (.46) | 2050 | Closed | HM | Ag/Pd |
| X20 | 0 | 97.7 A6 + | 2.3 | 2030 | Closed | HM | Ag/Pd |
| X21 | 0 | 97.7 A6 + | 2.3 | 2030 | Closed | HM | Au/Pt |

Table III-continued

| Ex-ample | Dielectric (% by weight) Glass | Dielectric (% by weight) Ceramic | $Bi_2O_3$ (% by wt.) | Firing Temp. (° F) | Firing Atm. | Type Capacitor | Type Electrode |
|---|---|---|---|---|---|---|---|
| X22 | 0 | 98.9 A6 + | 1.1 | 2030 | Closed | HM | Ag/Pd |
| X23 | 0 | 98.9 A6 + | 1.1 | 2030 | Closed | HM | Au/Pt |
| X24 | 0 | 98.3 A6 + +0.7 Ag | 1.0 | 2102 | Closed | M | Au/Pt |
| X25 | 0 | 99.3 A6 + +0.7 Ag | 0 | 2192 | Closed | HM | Au/Pt |

The last named firing procedure was also used in the preparation of the monolithic capacitor (M), example X-24, that was prepared in a preproduction pilot line. A silver paste was applied to opposite ends of the fired monolithic body at which edges the buried electrodes were exposed. The sample was then fired at 1400° F. for five minutes to cure the terminal layers. A lead wire was then soldered to each of the two silver terminals. Each capacitor contained four buried electrodes and three active dielectric layers, each active layer being about 0.001 inch in thickness.

A cross sectional view of a monolithic ceramic capacitor illustrating the structure of an experimental monolithic capacitor is shown in FIG. 1. The ceramic dielectric body 10 has buried therein electrode films 11 interleaved with electrode films 12. Conductive termination coatings 13 and 14 contact electrode sets 11 and 12, respectively. Lead wires 15 and 16 are attached by solder bonds 17 and 18 to terminations 13 and 14, respectively.

The fourth column in Table III shows the total amount of bismuth trioxide in the dielectric body in weight percent. Those figures shown in parentheses indicate that the bismuth is found originally in the glass. Figures not in parentheses indicate that the bismuth was added as $Bi_2O_3$ powder to the PLZT powder prior to firing.

The first three examples in Table III and IV represent monolithic glass-ceramic capacitors, all having silver-containing electrodes, wherein the bismuth oxide content of the glass increases such that the dielectric contains from 0 to 6.8 percent by weight bismuth trioxide from examples X1 to X3.

No substantial change is seen in the shape of the TCC curves until the 1.6% $Bi_2O_3$ of example X2 is exceeded as in the capacitors of example X3 wherein an improvement in the TCC curve is clearly achieved although some lead was apparently lost in the open slab firing and the K is depressed.

Performance data is provided in Table IV for the experimental samples. The K and DF were measured at 1KHz and 1 volt (r.m.s.) per mil.

Table IV

| Ex-ample | K 25° C | DF % | Ag in diel. (% by wt.) | TCC (%ΔC ref. 25° C) −55 °C | −30 °C | +85 °C | +125 °C |
|---|---|---|---|---|---|---|---|
| X1 | 1000 | 0.4 | | −12 | −3 | +7 | +1 |
| X2 | 1075 | 0.5 | | −14 | −4 | +4 | −3 |
| X3 | 775 | 0.25 | | −9 | 0 | +1 | −7 |
| X8 | 2250 | 1.85 | | −35 | −20 | 0 | −13 |
| X13 | - - porous body -- no data | | | | | | |
| X13a | 1425 | 0.2 | | −15 | −4 | +5 | 0 |
| X20 | 1450 | 0.2 | 0.91 | −4 | +2 | 0 | −7 |
| X21 | 2900 | 1.8 | 0 | −50 | −30 | −8 | −23 |
| X22 | 1625 | 0.1 | 0.76 | −7 | +3 | 0 | −10 |
| X23 | 3325 | 2.0 | 0 | −50 | −33 | −10 | −28 |
| X24 | 1950 | 0.2 | 0.37 | −21 | −3 | −3 | −15 |
| X25 | 2000 | 0.2 | 0.32 | −30 | −12 | +4 | −9 |

Figure 2:
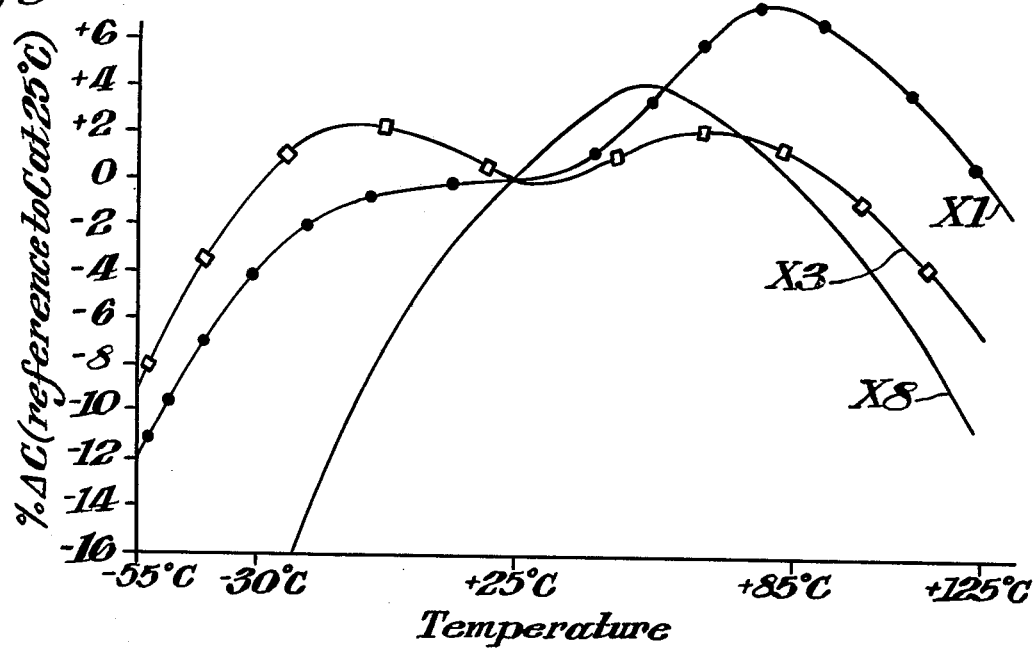
FIG. 2 shows a graph of capacity change as a function of temperature for particular experimental capacitors.
Figure 3:
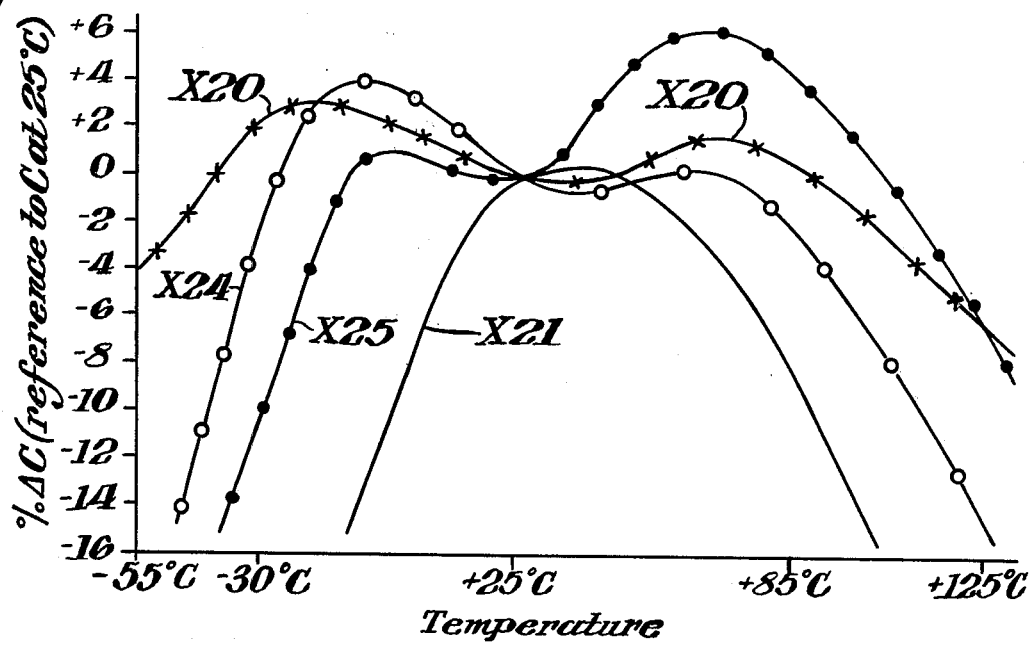
FIG. 3 shows a graph of capacity change as a function of temperature for additional experimental capacitors.

The capacitors of example X8 for which the TCC curve is shown in FIG. 2, contain no glass, no silver and no bismuth in the system; it was fired in air on an open slab. The last example shown in Tables III and IV, example X25 is essentially the same except 0.7 weight percent silver powder was mixed with the ceramic powder before firing, and the firing was accomplished in a closed crucible with lead titanate powder. From the TCC curve for example X25 shown in FIG. 3, the characteristic effect of the silver is clearly seen in the lifted low and high temperature ends of the curve in example X25. The closed crucible fired capacitors of examples X21 and X23 are similar to those of X8 but with bismuth trioxide added in various amounts. No effects of the bismuth additive are noted although the retention of the volatile lead at firing causes a reduction in the Curie temperature as seen in FIG. 3 for X21.

Examples X13 and X13a have only 2 weight percent glass added. The open fired capacitors of X13 did not mature whereas the closed crucible fired capacitors of example X13a fully matured and have a TCC just within the standard ±15% capacity change over −55° C. to 125° C. Even though the total amount of bismuth (orignally in the B-2 glass) was only 0.46% in the dielectric body, the closed firing at a temperature of 2050° C. was likely responsible for the smoother than anticipated TCC curve, making the small quantity of bismuth more active and available to accelerate to some extent the silver reaction compared to no such notable activity in example X2 having greater quantities of bismuth but having been fired at a considerably lower temperature.

The capacitors of example X20 were made in the same way as those of X21 except for having silver containing electrodes. The exceptionally smooth TCC of capacitors of X20 illustrates the effectiveness of a well balanced combination of silver and bismuth in a PLZT ceramic system. The result is a smooth TCC, a high K, a low DF and low VCC that is characteristic of anti-ferroelectric PLZT materials. Data relating to the VCC property is found in the above noted patent, U.S. Pat. No. 4,027,209 which is incorporated by reference herein.

The capacitors of X22 are similar to those of X20 except having a smaller additive quantity of bismuth therein, and are similar to those of X23 except having silver containing electrodes. The combination of electrical properties of capacitors X22 is excellent but somewhat less useful overall than that of capacitors X20.

The capacitors of X24 are similar to those of X25 except having bismuth trioxide added to the ceramic and silver formulation. The silver reaction with the PLZT ceramic is clearly more pronounced in capacitors X24 as is evidenced by the comparatively smoother TCC as shown in FIG. 3, and as evidenced by the larger amount of silver found in the dielectric material of the capacitors of X24.

The measurements (see Table IV) of silver content in the dielectric material were made by a scanning electron microscope at 20KV and 100 milliamperes. No substantial gradients of silver content were seen indicating a homogenous distribution of silver in the dielectric.

The various monolithic capacitors having silver bearing electrodes, above described, contained silver in the dielectric which resulted in an improved performance. From the fact that they exhibited excellent life test results (e.g. in example X1, IR exceeds 700 megohm microfarads after 100 hours at 100 volts/mil and 150° C.) it seems unlikely that the silver is contained in the free state in the dielectric material. Since silver has about the same ionic radius as lead (1.26Å versus 1.20Å), it is believed that the silver ions are diffusing into the crystal ceramic lattice and filling some of the vacant $Pb^{2+}$ sites and thus compensating for the loss of lead therein. It is further postulated that other dopant elements having about the same ionic radius, such as potassium or sodium may have a similar beneficial effect.

Capacitors of this invention may advantageously contain a silver doped ceramic dielectric that is accomplished either by introducing silver or silver oxide into the precursor oxides of the ceramic, or by simultaneously firing the body to maturity with silver containing electrodes having been applied thereto, or both. Alternatively, after blending the ceramic precursor oxides and calcining, crushing and pulverizing as described above, silver oxide may be added to this ceramic blend whereafter the silver doping is accomplished during the firing of the glass ceramic body. At the maximum firing temperature of 2200° F., the solidus of palladium-silver alloy occurs at about 60 weight percent silver. Large amounts of silver may be used of course when the firing temperature is lower (e.g., 75% Ag for firing at 200° F.) and smaller amounts of silver in a precious metal alloy with silver electrode tends to be more expensive. Thus an initial formulation for the alloy is preferred calling for the largest possible percent silver that will not melt at the temperature at which the capacitor is to be fired. However, after firing, the alloy looses some silver to the ceramic and the cofired electrode that began as 75% silver may become an alloy of as little as 10 to 15% silver.

What is claimed is:

1. A ceramic capacitor comprising a dielectric body and two spaced electrodes in contact with said dielectric body, said body consisting essentially of a dense high temperature ceramic, from 0 to 8 weight percent of a low temperature glass and at least 0.4 weight percent $Bi_2O_3$, said ceramic being doped with from 0.1 to 1.0 weight percent silver and consisting substantially of a lead zirconate wherein from 0.07 to 0.16 molar parts of said lead are replaced by lanthanum and wherein from 0.10 to 0.40 molar parts of said zirconate are replaced by titanate, from 0 to 100% of said $Bi_2O_3$ being contained in said glass.

2. The capacitor of claim 1 wherein said glass amounts to less than 4.5 weight percent of said dielectric body.

3. The capacitor of claim 1 wherein at least one of said electrodes is buried within said dielectric body.

4. The capacitor of claim 3 wherein said buried electrode is a silver alloy.

5. The capacitor of claim 1 wherein said glass amounts to about 7 weight percent of said body and said body contains more than 1.6 weight percent of said bismuth trioxide.

6. The capacitor of claim 5 wherein said glass has a composition having about 87 weight percent of said bismuth trioxide.

7. A method for producing a ceramic capacitor comprising preparing a mixture of from 99.6 to 92 parts by weight of a pulverized prefired lead zirconate ceramic, from 0 to 8 parts by weight of a finely ground low temperature glass and an organic binder medium wherein from 0.07 to 0.16 molar parts of said lead is replaced with lanthanum and wherein from 0.10 to 0.40 molar parts of said zirconate is replaced by titanate; including in said mixture at least 0.4% bismuth trioxide by weight of said ceramic and glass, forming a body of said ceramic mixture; adding a silver component within said body; forming two spaced electrodes in contact with said ceramic body; and firing said body to maturity at a temperature no greater than 2000° F. whereby said bismuth aids a reaction of said silver with said lead lanthanum zirconate titanate ceramic.

8. The method of claim 7 wherein said firing is accomplished at a temperature greater than 2000° F. and additionally comprising enclosing said body in a closed crucible during said firing.

9. The method of claim 8 additionally comprising adding a quantity of a lead containing compound within said closed crucible prior to said firing.

10. The method of claim 9 wherein no more than 50% of the volume of said closed crucible is occupied by air prior to said firing.

11. The method of claim 7 wherein said glass is less than 4½% by weight of said glass-ceramic mixture.

12. The method of claim 7 wherein said including of said bismuth is accomplished by incorporating from 0 to 100% of said bismuth trioxide in the formulation of said glass.

13. The method of claim 7 wherein said including is accomplished at least in part by adding bismuth trioxide powder to said ceramic mixture.

14. The method of claim 7 wherein said adding is accomplished by adding said silver component in powder form to said mixture.

15. The method of claim 14 wherein said silver component is elemental silver.

16. The method of claim 7 additionally comprising burying at least one of said electrodes within said body to make a monolithic ceramic capacitor.

17. The method of claim 16 wherein said adding of said silver is accomplished by forming said buried electrode of a silver alloy.

* * * * *